(12) United States Patent
Clausen et al.

(10) Patent No.: US 7,204,370 B2
(45) Date of Patent: *Apr. 17, 2007

(54) EXTENSION AND LOCKING ASSEMBLY FOR DRIPLESS ELEMENT AND CONTAINER THEREFORE

(75) Inventors: Michael D. Clausen, Turlock, CA (US); Steven R. Knight, Modesto, CA (US); Martin C. Maxwell, Canton, CT (US)

(73) Assignee: Parker Intangibles LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/424,993

(22) Filed: Jun. 19, 2006

(65) Prior Publication Data

US 2006/0231479 A1    Oct. 19, 2006

Related U.S. Application Data

(60) Continuation of application No. 11/207,099, filed on Aug. 18, 2005, now Pat. No. 7,086,537, which is a continuation of application No. 11/034,909, filed on Jan. 13, 2005, now Pat. No. 6,986,426, which is a continuation of application No. 10/989,776, filed on Nov. 16, 2004, now Pat. No. 6,983,851, which is a continuation of application No. 10/371,751, filed on Feb. 21, 2003, now Pat. No. 6,837,993, which is a division of application No. 09/584,972, filed on Jun. 1, 2000, now Pat. No. 6,554,139.

(51) Int. Cl.
*B01D 27/04* (2006.01)
*B01D 27/08* (2006.01)

(52) U.S. Cl. ............ 210/435; 210/447; 210/453; 210/455; 210/457; 210/493.2; 210/497.01

(58) Field of Classification Search ........... 210/130, 210/232, 429, 430, 443, 435, 444, 446, 447, 210/457, 458, 453, 440, 493.1, 493.2, 493.5, 210/483, 497.01, 455

See application file for complete search history.

(56) References Cited

U.S. PATENT DOCUMENTS

| 2,486,711 | A | 11/1949 | Harris |
| 3,698,562 | A | 10/1972 | Farrow et al. |
| RE29,447 | E | 10/1977 | Farrow et al. |
| 4,522,712 | A | 6/1985 | Fischer et al. |
| 4,536,291 | A | 8/1985 | Hoffmann et al. |
| 4,692,245 | A | 9/1987 | Church et al. |
| 4,754,896 | A | 7/1988 | Roltgen et al. |
| 4,824,564 | A | 4/1989 | Edwards et al. ............ 210/232 |
| 5,045,192 | A | 9/1991 | Terhune |
| 5,154,823 | A | 10/1992 | Ma et al. |
| 5,186,829 | A | 2/1993 | Janik |
| 5,244,571 | A | 9/1993 | Church et al. |
| 5,413,712 | A | 5/1995 | Gewiss et al. ............ 210/450 |
| 5,468,386 | A | 11/1995 | Ardes |
| 5,770,054 | A | 6/1998 | Ardes |
| 5,770,065 | A | 6/1998 | Popoff et al. ............ 210/232 |
| 5,855,780 | A | 1/1999 | Dye et al. |
| 5,948,248 | A | 9/1999 | Brown ................ 210/206 |
| 6,053,334 | A | 4/2000 | Popoff et al. |
| 6,235,194 | B1 | 5/2001 | Jousset ................ 210/206 |
| 6,554,139 | B1 * | 4/2003 | Maxwell et al. ............ 210/435 |
| 6,983,851 | B2 * | 1/2006 | Maxwell et al. ............ 210/435 |
| 6,986,426 | B2 * | 1/2006 | Clausen et al. ............ 210/435 |
| 7,086,537 | B2 * | 8/2006 | Maxwell et al. ............ 210/435 |

FOREIGN PATENT DOCUMENTS

| CA | 824484 | 10/1969 |
| DE | 296 23 867 | 10/1992 |
| DE | 4111407 | 10/1992 |

OTHER PUBLICATIONS

The Communication Relating to the Results of the Partial International Search in corresponding PCT Case No. PCT/US01/14759.
Notification of the International Search Report or the Declaration, dated Jan. 21, 2002, in corresponding PVT Application No. PCT/US01/14759.
International Application No. WO 92/18397 entitled "Re-Usable Packing Container for Filter Elements" published Oct. 29, 1992.

Partial translation of WO 92/18397 beginning on p. 7, last paragraph and ending after the first partial paragraph on p. 9.
International Publication No. WO 01/21278 dated Mar. 23, 2001.

* cited by examiner

*Primary Examiner*—Ernest G. Therkorn
(74) *Attorney, Agent, or Firm*—Christopher H. Hunter

(57) ABSTRACT

A filter assembly includes housing enclosing a replaceable filter element. A support core is provided in the housing, and includes an extension and locking assembly. The element includes a ring of filtration media with a pair of end caps. The first end cap includes a central opening to receive the support core. The extension and locking assembly prevents the cover of the housing from being attached to the housing body without a proper filter element installed. The extension and locking assembly includes a bypass member and a locking member, which are in locking engagement when an element is absent in the housing. The second end cap includes internal protrusions which engage the locking member when the filter element is installed to disengage the bypass member from the support core, and allow the element to be inserted and the cover to be installed.

12 Claims, 16 Drawing Sheets

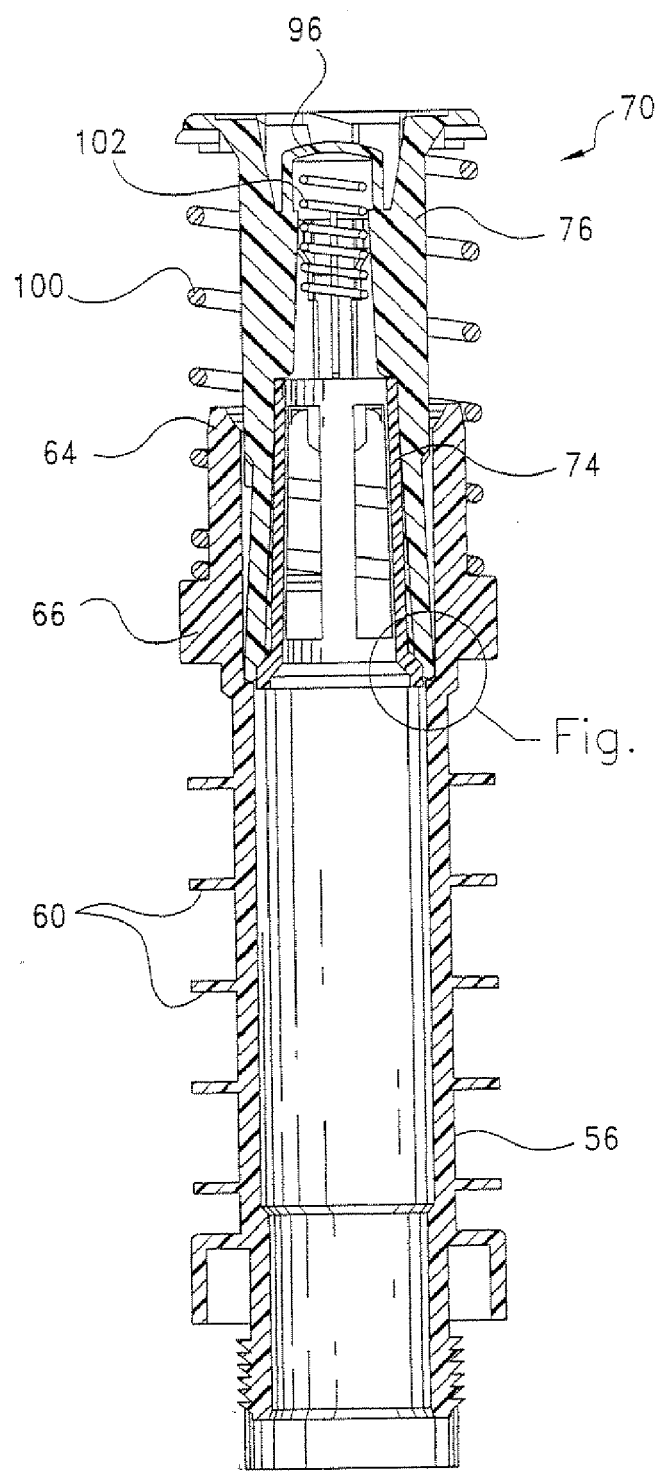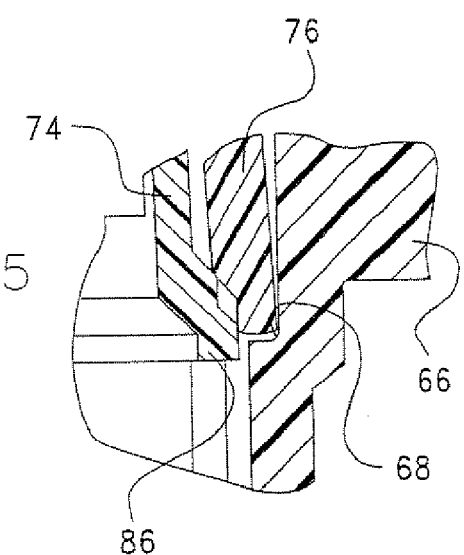
Fig. 5
Fig. 4

EXTENSION AND LOCKING ASSEMBLY FOR DRIPLESS ELEMENT AND CONTAINER THEREFORE

RELATED CASES

This application is a continuation of U.S. patent application Ser. No. 11/207,099, filed Aug. 18, 2005, now U.S. Pat. No. 7,086,537 which is a continuation of U.S. patent application Ser. No. 11/034,909, filed Jan. 13, 2005, now U.S. Pat. No. 6,986,426 which is a continuation of U.S. patent application Ser. No. 10/989,776, fled Nov. 16, 2004, now U.S. Pat. No. 6,983,851 which is a continuation of U.S. patent application Ser. No. 10/371,751, filed Feb. 21, 2003, now U.S. Pat. No. 6,837,993; which is a divisional of U.S. patent application Ser. No. 09/584,972, filed Jun. 1, 2000, now U.S. Pat. No. 6,554,139, the disclosures of which are incorporated herein by reference.

FIELD OF THE INVENTION

This invention relates to fluid filters, and more particularly to fuel filters for vehicles.

BACKGROUND OF THE INVENTION

Many types of filters (also referred to as "separators") are known in the prior art. Filters are widely known for removing contaminants and other impurities from fluids such as fuel and oil. A popular type of filter has a housing that encloses a replaceable ring-shaped filter element. The filter element ensures that impurities are removed from fuel or oil before it is delivered to system components such as fuel injection pumps and fuel injectors. Mating portions of the housing form an interior enclosure for the element, and the housing portions may be separated for replacement of a spent filter element. Periodic replacement of the filter element is required so that the filter element will not become so loaded with impurities that flow is restricted. It is known that problems may arise when such filter elements are replaced.

One problem is that filter elements with different sizes and/or filtration capabilities often have identical mounting configurations and can fit on the same filter head. However, use of the wrong filter element can cause poor engine performance and allow undesirable amounts of contaminants to pass through the system.

Another problem is that individuals may remove a spent filter element and simply re-attach the housing portions without a fresh element. If an automatic drain valve is used in the filter (see, e.g., U.S. Pat. No. 5,468,386), fuel or oil can be dumped to drain when an element is not installed in the housing. While the engine may operate (at least for a short period of time), this can be detrimental to the engine, particularly if the operation of the engine depends on the continued supply of oil or fuel from the filter.

A still further problem is that upon removing the element, an individual may come into contact with the fuel/oil and any impurities on the element, and get dirty hands. The user typically has to reach down into the housing to grasp the element, and may come into contact with residual fuel or oil in the housing and on the element. In addition, any fuel or oil remaining on the element may drip off on the surrounding engine components when the element is removed, thereby fouling the engine; or worse yet, drip off onto the ground and create environmental issues.

To reduce and at least partially eliminate some of these problems, the filter assembly shown in U.S. Pat. No. 4,836,923, owned by the Assignee of the present application, was developed. This filter assembly includes a unique replaceable filter element that is attached to a removable cover. The filter element includes an opening in one end cap opposite from the cover, which allows the filter element to be removeably located over an elongated standpipe in the housing. The element is removed when the cover is removed (screwed off) from the housing. While this reduces skin contact with the element and thereby reduces the mess associated with an element change, this does not fully address the problem with fuel, oil and impurities draining off the element as it is removed from the housing and carried across the engine.

In addition, the cover of the housing in the '923 patent is typically discarded with each spent element. This is undesirable from a conservation and solid waste standpoint, as the cover is usually a heavy plastic or metal component. It is generally desirable to minimize the amount of material discarded, particularly if a discarded element must be treated as hazardous waste and/or cannot be easily incinerated. The cover also represents a portion of the cost of the replacement element. As a result, this design adds cost to the replacement element.

The element in the '923 patent may also be separated from the cover, and the cover re-attached to the housing without a fresh element also being installed. As such, this design does not fully address the problems associated with operating an engine without a filter element installed.

An improved filter assembly is shown in U.S. Pat. No. 5,770,065, also owned by the assignee of the present application. In this patent, a standpipe is similarly provided internally to the housing, and a spring-biased valve element is provided internal to the standpipe. The valve element is normally closed, and can be engaged and moved to an open position by a projection on an end cap of the element when the element is properly installed in the housing. The valve (and hence the filter assembly) generally cannot be operated without a proper filter element installed. The filter shown in the '065 patent overcomes some of the problems associated with the earlier '923 patent, however, the cover is attached to the element in the same manner as in the '923 patent, and fuel and oil can still drip onto the engine and the surrounding area when the filter element is replaced. Also, as in the '923 patent, the cover may be detached from the element and screwed back onto the housing with out a fresh element being installed. In some high-pressure fuel systems, the valve element may actually be forced open, and unfiltered fuel can be allowed to pass to the downstream components. This can also be detrimental to the engine.

It is therefor believed there exists a need for a still further filter that reduces if not eliminates, the mess and environmental issues associated with changing an element; and prevents the operation of the filter without a proper filter element.

SUMMARY OF THE PRESENT INVENTION

A new and unique filter assembly is provided that prevents an improper filter element from being used in the filter and prevents operation of the filter without a filter element in place. Mess and environmental issues are substantially reduced, if not eliminated, during an element change. The filter element is also simple and low-cost to manufacture.

According to the present invention, the filter assembly includes a replaceable element with a ring of filtration media, and an end cap sealingly bonded to either end of the filtration media. An internal support core is fixed to an end wall of the filter housing, and one of the end caps of the filter element include a central opening, such that the filter element can be removably received over the support core. The support core provides internal support for the filter element, so that the filter element can be composed of only material which is easily incinerated.

An extension and locking assembly is provided with the support core. The extension and locking assembly operates to prevent the cover of the housing from being attached to the housing body without a proper filter element installed in the housing, or without a filter element in the housing. The extension and locking assembly includes a bypass member and a locking member. The bypass member is closely and slideably received in the locking member, while the locking member is closely and slideably received in the support core. In one embodiment, both the locking member and the bypass member have enlarged heads, with the enlarged head of the bypass member overlying the enlarged head of the locking member. A main spring extends between a shoulder on the support core and the enlarged head of the locking member to bias the locking member and bypass member outwardly from the support core.

When the locking member and bypass member are in their outer position, the distal inner end of the locking member urges the distal inner end of the bypass member radially outward against the inner surface of the support core. The support core includes an annular step or shoulder along its inner surface, and the distal inner end of the bypass member engages the step to prevent the extension and locking assembly from being pushed inwardly into the support core. The extension and locking assembly is long enough such that the cover of the housing cannot be attached to the housing body when the extension and locking assembly is in its outer position.

The enlarged head of the bypass member includes a series of openings which allow access to the enlarged head of the locking member. The openings are strategically placed, and the other end cap (opposite from the end cap of the filter element with the central opening) has a series of protrusions that extend axially inward from the end cap, in orientation with the openings. When the element is installed over the support core, the protrusions extend through the openings in the head of the bypass member and engage the head of the locking member. The protrusions force the locking member axially inward, and in so doing, move the distal inner end of the locking member away from the distal inner end of the bypass member. This allows the distal inner end of the bypass member to disengage from the step in the support core, and the locking member and bypass member to slide inwardly (retract) into the support core. In its inner position, the extension and locking assembly allows the filter element to be properly located in the filter housing, and the cover to be attached to the housing body.

As should be appreciated, a filter element without a correct arrangement of protrusions on its end cap will not engage the head of the locking member, and the extension and locking assembly will remain locking in its outer position, thereby preventing the filter element from being properly assembled in the filter housing.

Another feature of the filter assembly is that during an element change, when the cover is removed, the extension and locking assembly will urge the spent element slightly outwardly from the housing, as the extension and locking assembly moves to its outer position. This facilitates removing the spent filter element from the housing, and reduces contact with any fuel or oil remaining in the housing.

A bypass valve can be provided in the bypass member to allow fluid to bypass the filter element when the filter element becomes clogged with impurities. The bypass valve can be provided as a unitary piece with the bypass member, or as a separate piece supported by the bypass member. A bypass spring biases the head of the bypass valve against a central opening in the adjacent end cap to normally prevent fluid bypassing the element, but to allow fluid bypass when the pressure in the housing increases above a predetermined amount.

As discussed above, the filter element includes a pair of end caps, with a first of the end caps including a central opening to receive the central support core. The second end cap includes the protrusions for operating the extension and locking assembly, and can include a central opening if the bypass valve is used. The central opening in the second end cap is preferably bounded by a short annular flange, which extends inwardly into the filter element, and seals against the bypass valve when the element is located in the housing. The flange and protrusions can be easily formed with the end cap such as by molding the end cap as a unitary component, and the filter element is otherwise a simple and inexpensive component to manufacture. While not as preferred, the protrusions could also be formed on a separate piece and held against the inside surface of the second end cap.

Another feature of the present invention is that the filter element is preferably stored for shipment in a fluid-tight container. The container includes a cup-shaped body and a lid, with the lid being easily attachable to the body to allow easy access to the filter element. The body and lid are preferably formed from inexpensive, lightweight, incineratable material, for example, a plastic. The container body includes a retaining device, such as a ridge or bead, integral with either the sidewall and/or end wall of the body, which is designed to engage an appropriate part of the element and retain the element in the body. The retaining device can have a number of different forms, and can be configured to engage different locations on the filter element to retain the element within the container body. It is preferred that the retaining device be resilient, and resiliently deflect to engage a portion of the end cap, such as the outer periphery of one of the end caps.

During an element change, a fresh element can be removed from the container and set aside. The empty body of the container is then inverted, and inserted open-end first into the open end of the filter housing, in surrounding relation to the spent element. This is facilitated by the element sitting slightly outwardly from the housing as discussed above. The resilient retaining device engages the element, and cooperates with the element to retain the element to the body. The container body is then removed from the housing, with the element attached thereto. Upon removing the body from the housing, the body is immediately turned upright, thereby preventing any fuel or oil from dripping off the element and contaminating the surrounding area. The lid is then attached to the body, and the entire assembly, with the spent element, can then be disposed of such as by incineration.

Thus, as described above, the filter of the present invention prevents an improper filter element from being used in the filter, and prevents operation of the filter without a filter element in place. Mess and environmental issues are substantially reduced, if not eliminated, during an element change. The filter element is also simple and low-cost to manufacture.

Further features and advantages will be apparent upon reviewing the following Detailed Description of the Preferred Embodiment and the accompanying Drawings.

BRIEF DESCRIPTION OF THE DRAWINGS

FIG. 4 is a cross-sectional side view of a portion of the filter of FIG. 1, illustrating the outer position of the extension and locking assembly;

FIG. 5 is an enlarged view of a portion of the filter of FIG. 4;

DETAILED DESCRIPTION OF THE PREFERRED EMBODIMENT

Figure 1:
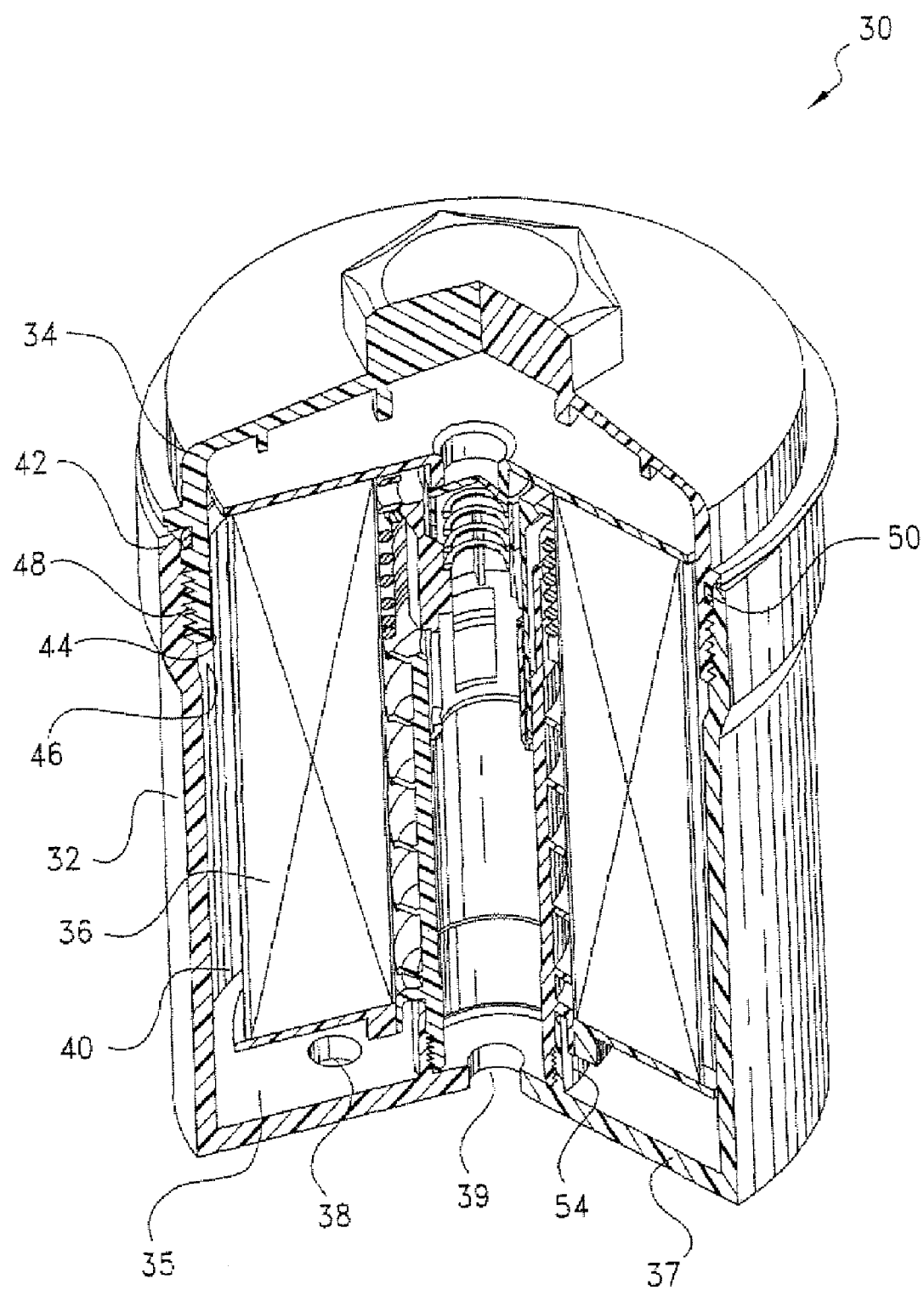
FIG. 1 is an elevated perspective view in partial cross section of a first embodiment of the filter constructed according to the principles of the present invention.

Referring now to the drawings, and initially to FIG. 1, a first embodiment of a filter constructed according to the principles of the present invention, is indicated generally at 30. The filter 30 is particularly suited for filtering water and other particulate and contaminants from fuel (e.g., diesel fuel), but is generally appropriate for separating any low density fluid (e.g., water) from a higher density fluid (e.g., oil). The filter 30 of the first embodiment includes an annular housing body 32 with a cup-shaped cover 34 removeably attached to an open end of the housing body. The housing body 32 and cover 34 define an interior cavity 35 for a removable filter element 36. Housing 32 and cover 34 are formed from materials appropriate for the particular application, for example hard plastic, and the housing 32 is fixed to an appropriate location on the engine.

Annular housing body 32 includes a disk-shaped end wall 37, an inlet port 38 and an outlet port 39 which direct fuel into and out of the filter. The inlet and outlet pons are illustrated as being formed in the end wall 37, however one or both could also be formed in housing body 32, or even in cover 34. In any case, fuel (or oil) to be filtered is directed through inlet port 38 and into a peripheral region 40 of the filter, between housing body 32 and filter element 36. The fuel then passes radially inward through element 36, where contaminants/particulate in the fuel are removed, and the filtered fuel then passes through port 39 to the downstream components of the fuel system.

The housing body 32 includes an open end 42, and a series of internal threads 44 are provided near the open end. The cover 34 also includes an open end 46, with a series of external threads 48 provided near the open end. Threads 44 of housing cooperate with threads 48 of cover 34 to enable the cover to be easily screwed onto and off of the housing. An O-ring seal or gasket 50 is provided between the housing components to provide a fluid-tight seal. The above is only one technique for attaching the cover to the housing, and other techniques are possible as should be known to those skilled in the art.

A threaded spud or collar 54 is provided centrally in the end wall 37 of the housing, and bounds outlet port 39. Spud 54 projects axially upward a short distance from the end wall 37 toward the open end 42 of the housing body.

If necessary or desirable, an automatic drain valve (not shown) can be installed in the end wall 37 of the housing, such as described in U.S. Pat. No. 5,468,386. This patent is incorporated herein by reference.

Referring now to FIGS. 2–5, a support core or tube 56 extends along the axial 10 center line of the housing, and includes a threaded inner end 57 which is screwed into and sealingly received in spud 54. The inner end of the support core includes a short annular skirt 58 (see also FIG. 8) which is radially outwardly spaced from the core, and is closely outwardly received around spud 54. The support core 56 includes a series of ribs or flights as at 60 along its length. Flights 60 preferably extend in a continuous helix, and facilitate the movement of fuel along the length of the support core, as well as provide uniform support along the inside surface of the filter element 36. The support core 56 preferably has one or more openings 62 (FIG. 3) toward its outer (upper) end 64 to allow fuel to pass inward into the support core. The remainder of the length of the support core can be imperforate, or may also have appropriate openings, depending upon the desired level of fuel to be maintained in the support core. In certain situations, it is desired to maintain a certain level of fuel in the support core for the smooth operation of the filter during start-up. Finally, the support core includes an outer annular shoulder 66 and an inner annular step 68 (FIG. 5), both at appropriate locations along the length of the core, and the reasons for which will be described below. Support core 56 is formed of material, e.g., hard plastic, appropriate for the particular application.

Figure 3:
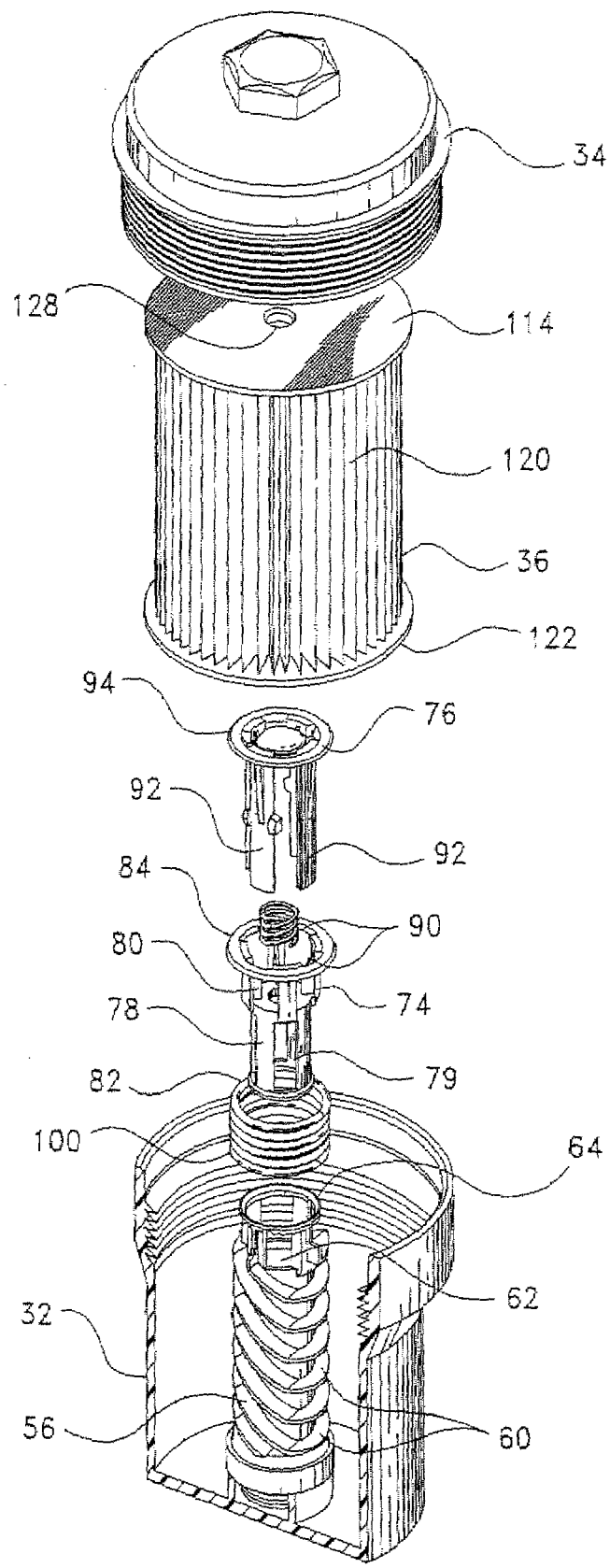
FIG. 3 is an exploded view of certain components of the filter of FIG. 1.

An extension and locking assembly, indicated generally at 70 in FIG. 4, is received in support core 56. Extension and locking assembly 70 prevents the cover 34 from being attached to housing body 32 unless a proper filter element is installed in the housing. To this end, the extension and locking assembly 70 include a locking member 74 and a bypass member 76; with locking member 74 being closely and slidingly received in bypass member 76, and bypass member 76 being closely and slidingly received in support core 56. As shown in FIG. 3, locking member 74 includes a body 78 with a series of lower openings 79 for fluid flow, a series of upper openings 80, an annular base 82, and an enlarged annular head 84. The base 82 of the locking member includes a radially-outward projecting annular flange 86 (see FIG. 5). Body 78 includes a series of inner axial channels or slots 90, which are positioned to slidingly receive fingers 92 of bypass member 76. Locking member 74 is preferably formed unitarily (in one piece) from appropriate material, such as hard plastic.

Bypass member 76 includes fingers 92 and an enlarged annular head 94 which overlays the enlarged annular head 84 of locking member 74 when fingers 92 are received in channels 90. Fingers 92 extend along slots 90 in locking member 74, and project outwardly (downwardly in the Figures) through upper openings 80. An imperforate dome-shaped end wall 96 is provided radially inwardly of head 94, as shown in FIG. 4. Bypass member 76 is also preferably formed unitarily (in one piece) from appropriate material, such as hard plastic.

A main spring 100 is provided in surrounding relation to the outer (upper) end of support core 56 and the locking member 74 and bypass member 76. Spring 100 extends between annular shoulder 66 on support core 56 and the enlarged head 84 of locking member 74. Spring 100 urges the head of locking member 74 against the head of bypass member 76, and hence urges these components axially outward from support core 56. When the bypass member 76 is received in locking member 74, fingers 92 of bypass member 76 project axially through openings 80 in locking member 74 and are received between the annular base 82 of the locking member and the inside surface of the support core, as best seen in FIG. 5. The annular flange 86 of the base 82 urges the fingers 92 radially outward against the inner surface of the support core, and creates an interference fit to retain the locking member and bypass member in the support core, that is, to prevent the main spring 100 from pushing these components entirely outwardly from the support core. A bypass spring 102 is provided internally of the dome-shaped end wall 96 (as seen in FIG. 4), and biases bypass member 76 outwardly away from locking member 74. Bypass spring 102 extends between the dome-shaped end wall 96 and a radially inward directed annular spring stop 106 (FIG. 2) on locking member 74.

Figure 9:
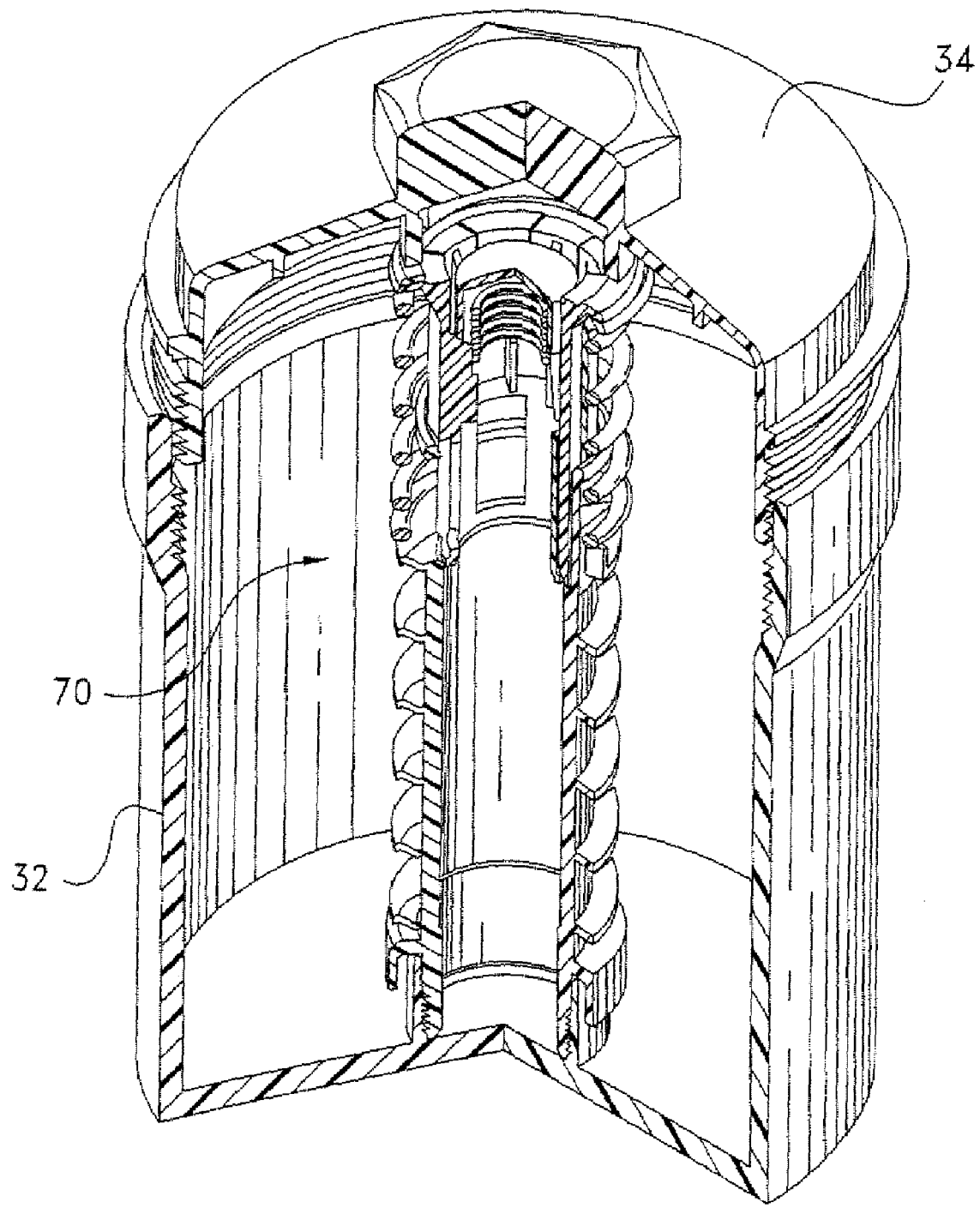
FIG. 9 is cross-sectional side view of the filter, illustrating the extension and locking assembly in an outer position.

As indicated above, the extension and locking assembly prevents attachment of the cover 34 to the housing body 32 without a proper filter element installed in the housing. As illustrated in FIG. 4, the main spring 100 normally urges the locking member and bypass member outwardly such that the distal inner ends of the fingers 92 of the bypass member 76 are axially outward of the annular step 68 (FIG. 5) in the support core. The annular base 82 of the locking member 74 urges the fingers 92 radially outward against the support core, such that the fingers engage the step and prevent the extension and locking assembly from being pushed inwardly into the support core. As illustrated in FIG. 9, the extension and locking assembly 70 has an axial length sufficient that the cover 34 cannot be fully screwed onto the housing body 32 when the extension and locking assembly is in its outer position.

Figure 6:
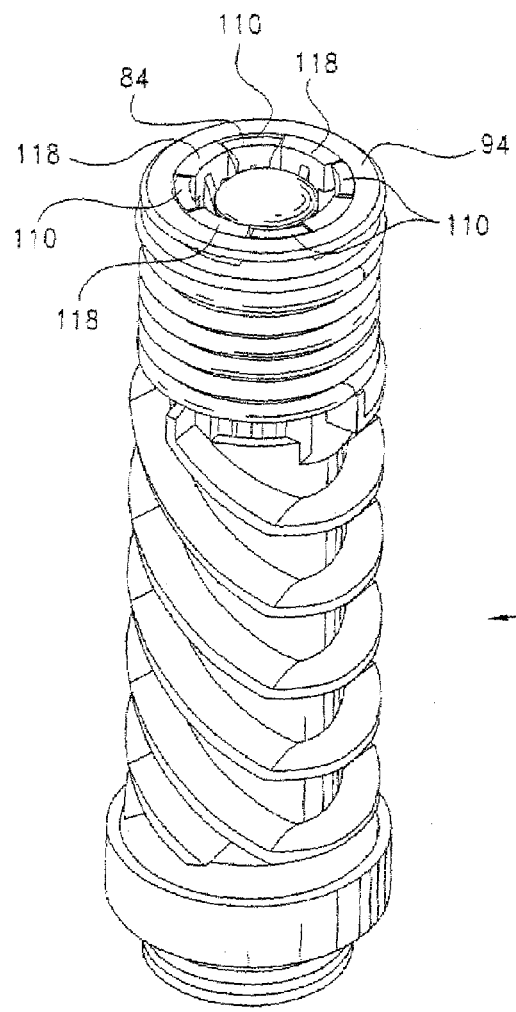
FIG. 6 is an elevated perspective view of the extension and locking assembly for the filter of FIG. 1.
Figure 7:
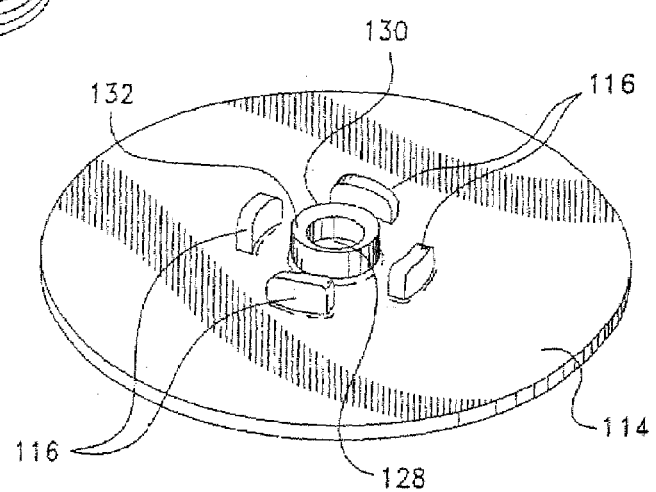
FIG. 7 is an inside view of the upper end cap for the filter element.

To disengage the bypass member from the step in the support core, the base 82 of the locking member is moved axially away (inwardly) from the distal ends of the fingers 92 of the bypass member. As shown in FIG. 6, the head 94 of the bypass member has a series of openings 110 that allow access to the underlying head 84 of the locking member. The filter element has an end cap 114, which as shown in FIG. 7, has a series of distinct, axially-extending protrusions 116 corresponding to the location of the openings 110 in the bypass valve head 94. As illustrated, four such protrusions 116 are shown in a generally evenly-spaced annular arrangement extending outwardly, away from the end cap 114, however the number and spacing of the protrusions can vary depending upon the number and location of openings 110, and it is noted that only a single protrusion may be necessary in some applications. The distal ends of the protrusions 116, and/or the lands 118 between the openings 110, can have angled or helical ramped surfaces, to facilitate the orientation of the protrusions with the openings 110. The angled or helical surfaces force or urge the filter element to rotate when the element is installed in the housing such that the protrusions 116 automatically become aligned with the openings 110.

Figure 2:
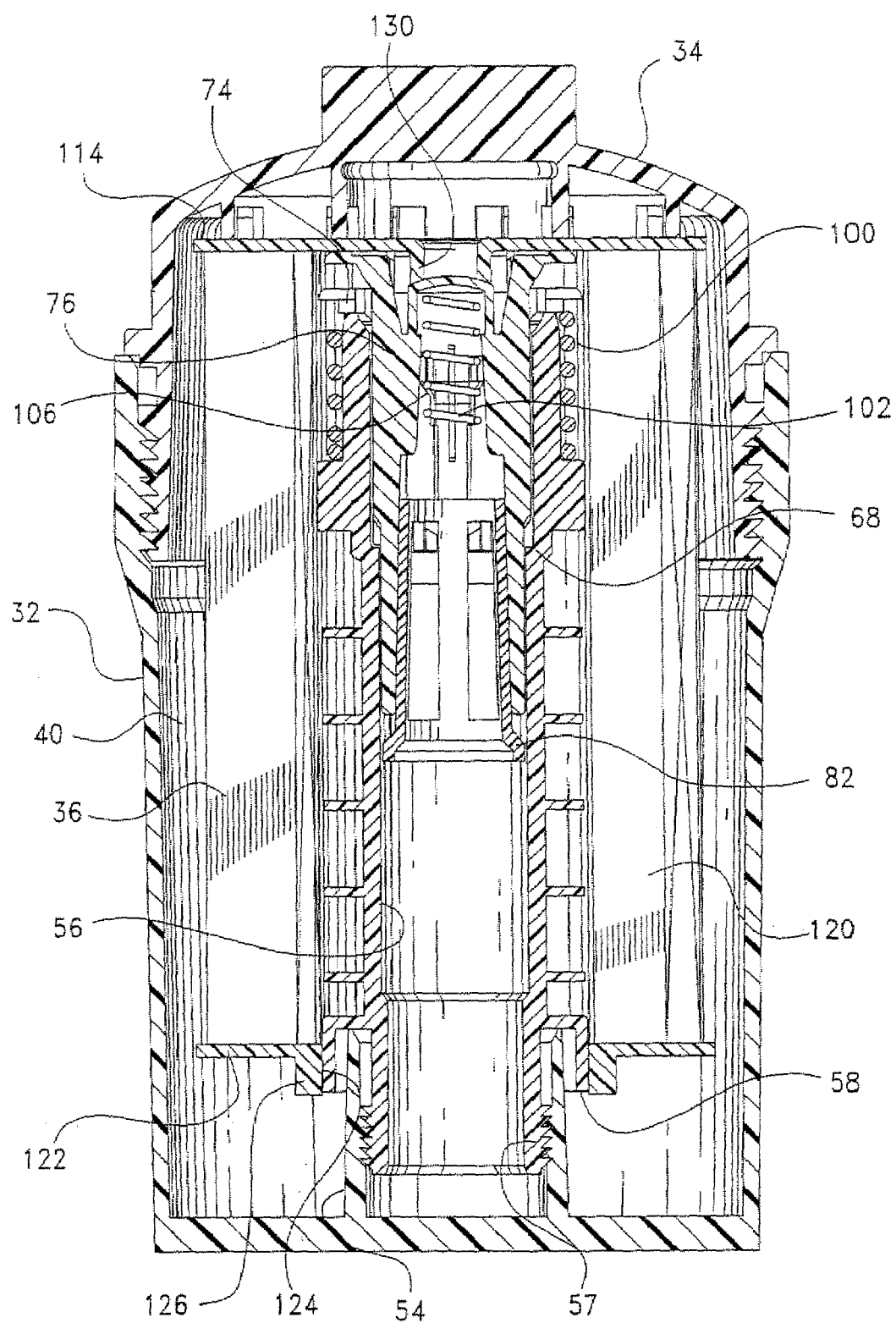
FIG. 2 is a cross-sectional side view of a portion of the filter shown in FIG. 1.
Figure 8:
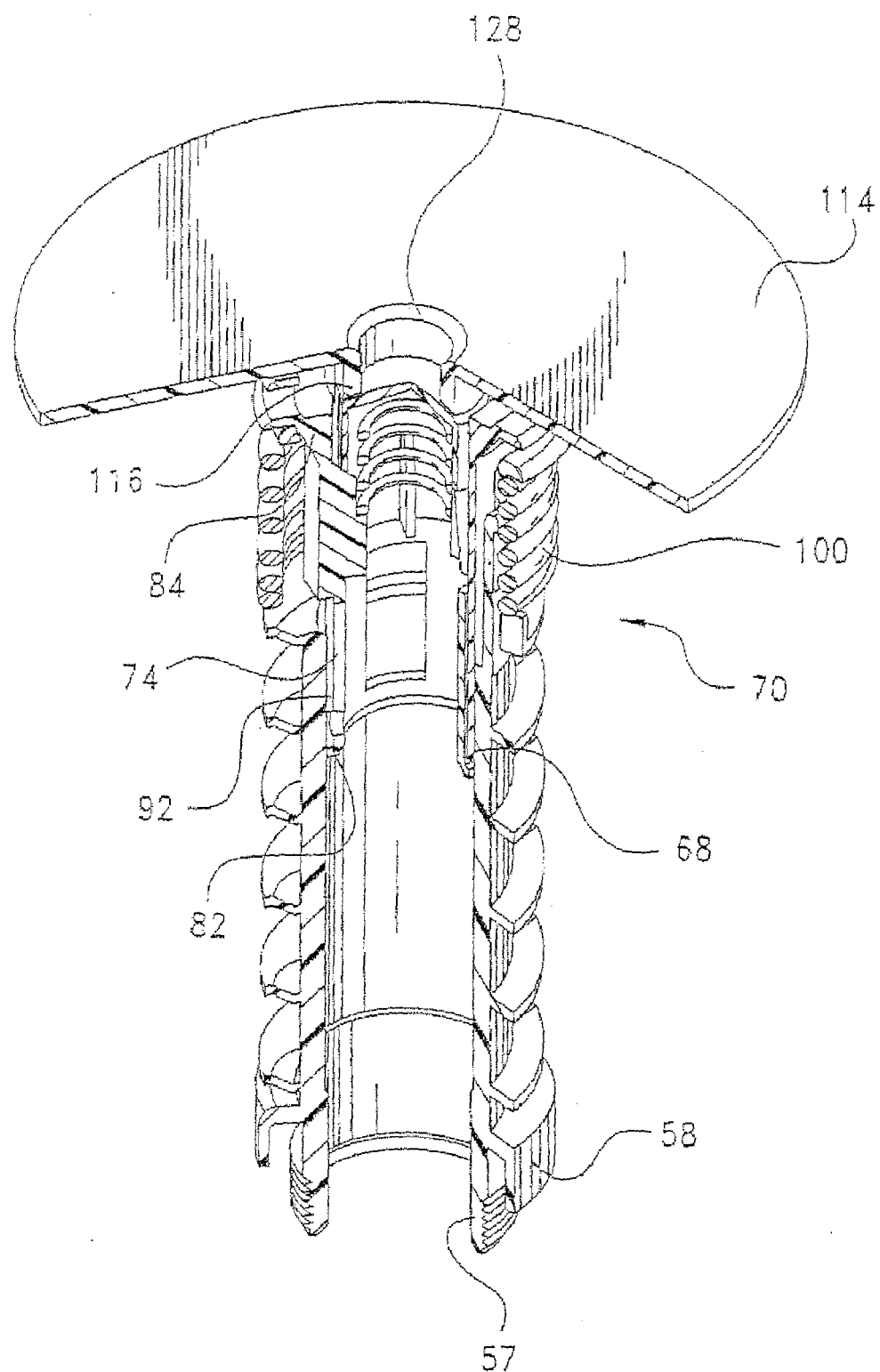
FIG. 8 is a cross-sectional side view of the extension and locking assembly, illustrating the end cap of the filter element engaging the locking member.

When the filter element is installed in the housing, the protrusions 116 on the end cap 114 project through openings 110, and engage the head 84 of the locking member 74. The protrusions 116 force the locking member axially inward into the support core, as shown in FIGS. 2 and 8. The base 82 of the locking member moves axially away from the inner ends of fingers 92 of bypass member 76, thereby allowing the fingers to disengage from step 68 and the bypass member to slide inwardly into the support core. This allows the extension and locking assembly to retract into the support core, compressing main spring 100, and allows the cover 34 to be attached to the housing body 32. The length of the protrusions necessary to move the locking member an appropriate axial distance can be easily determined.

It should be appreciated that an element without a proper arrangement of protrusion(s) will not engage the head of the locking member, and the extension and locking assembly will remain locked in its outer position. It will not be possible to attach the cover 34 to the housing body 32. Thus, the invention not only prevents the operation of the filter without a filter element installed, but also prevents the operation of the filter even if an element is installed, but where the element fails to have a proper arrangement of protrusion(s).

Referring again to FIGS. 2 and 3, the filter element 36 includes a ring of filtration media 120 formed of an appropriate material in an appropriate manner. The element also includes a disk-shaped end cap 114 sealingly bonded (such as with adhesive) to the outer (upper) end of the media ring; and an opposite disk-shaped end cap 122 sealingly bonded (such as with adhesive) to the inner (lower) annular end of the media ring. The end cap 122 includes a central circular opening 124 dimensioned to receive the support core 56 and enable the filter element to be removeably located over the support core. A short annular flange 126 projects axially downward and bounds opening 124 in end cap 122, to provide a fluid-tight seal against the sleeve 58 of the support core. Alternatively (or in addition), an O-ring or resilient gasket (not shown) can be provided between the end cap 122 and the support core 56.

The outer end cap 114 also includes a central opening 128, with a diameter somewhat smaller than the opening 124 end cap 122. As shown in FIG. 7, an annular flange 130 bounds the opening 128 in end cap 114, and projects a short distance axially inward into the filter element from end cap 114 toward end cap 122 (but terminating at a point much closer to end cap 114 than end cap 122). The protrusions 116 are spaced radially inward from the ring of filtration media 120 and radially outward from flange 130. Flange 130 includes a tapered distal end 132 which is dimensioned to engage flush against the dome-shaped end wall 96 of the bypass member 76 when the element is located in the housing (see, e.g., FIG. 2). The inner and outer end caps 114, 122 are preferably each formed of an appropriate material (such as plastic) unitarily (in one piece) in a conventional manner, such as by molding.

The dome-shaped end wall 96 and bypass spring 102 of the bypass member, and the flange 130 on the end cap 114 provide a bypass valve for the filter element. When the element is located in the housing, the flange 130 engages and seals against the dome-shaped end wall 96, thereby preventing fluid from bypassing the element. When an overpressure situation exists in the peripheral region 40 of the element, such as when the element becomes plugged, the pressure forces bypass member 76 inwardly against bypass spring 102, thereby creating a flow gap between the end wall 96 and the flange 130, and allowing fluid to bypass the element. The spring constant of bypass spring 102 can be chosen to determine the appropriate cracking force for the bypass feature. Further discussion of the bypass valve can be found, for example, in U.S. Pat. No. 5,770,054, which is incorporated herein by reference. It is noted that the bypass valve is an optional feature, and that the filter could also be configured without such a bypass valve, in which case end wall 96 and spring 102 would be absent, and the end cap 114 would be continuous (imperforate) across its diameter.

While it is illustrated above that the locking member and bypass member are received internally of the support core, it is anticipated that with appropriate modifications, the bypass member and locking member could likewise be received around (outwardly from) the support core. In this case, the bypass member and locking member could function in the same manner as described above to lock the extension and locking assembly in an outward position when an element is absent from the housing, and allow the extension and locking assembly to move inwardly when an appropriate filter element is located in the housing.

When the element is installed properly in the housing, the fuel entering inlet port 38 flows into the peripheral region 40 surrounding the element, and then radially inward through the element to the support core 56. The filtered fuel then passes through the support core to the outlet 39. If an element becomes clogged and a bypass valve is provided, the valve will allow fluid to bypass the element when the fluid pressure in the peripheral region 40 exceeds a predetermined amount. When it is desirable to change a spent element, the cover 34 is removed (screwed off), and the element can be easily accessed and replaced with a fresh element. To facilitate the easy grasping of the spent element, the extension and locking assembly 70 automatically pushes the spent element outwardly a short distance by virtue of main spring 100. This also allows at least some of the fuel to drip off the element and remain in the filter housing, rather than drip onto the surrounding area during element removal.

Figure 10:
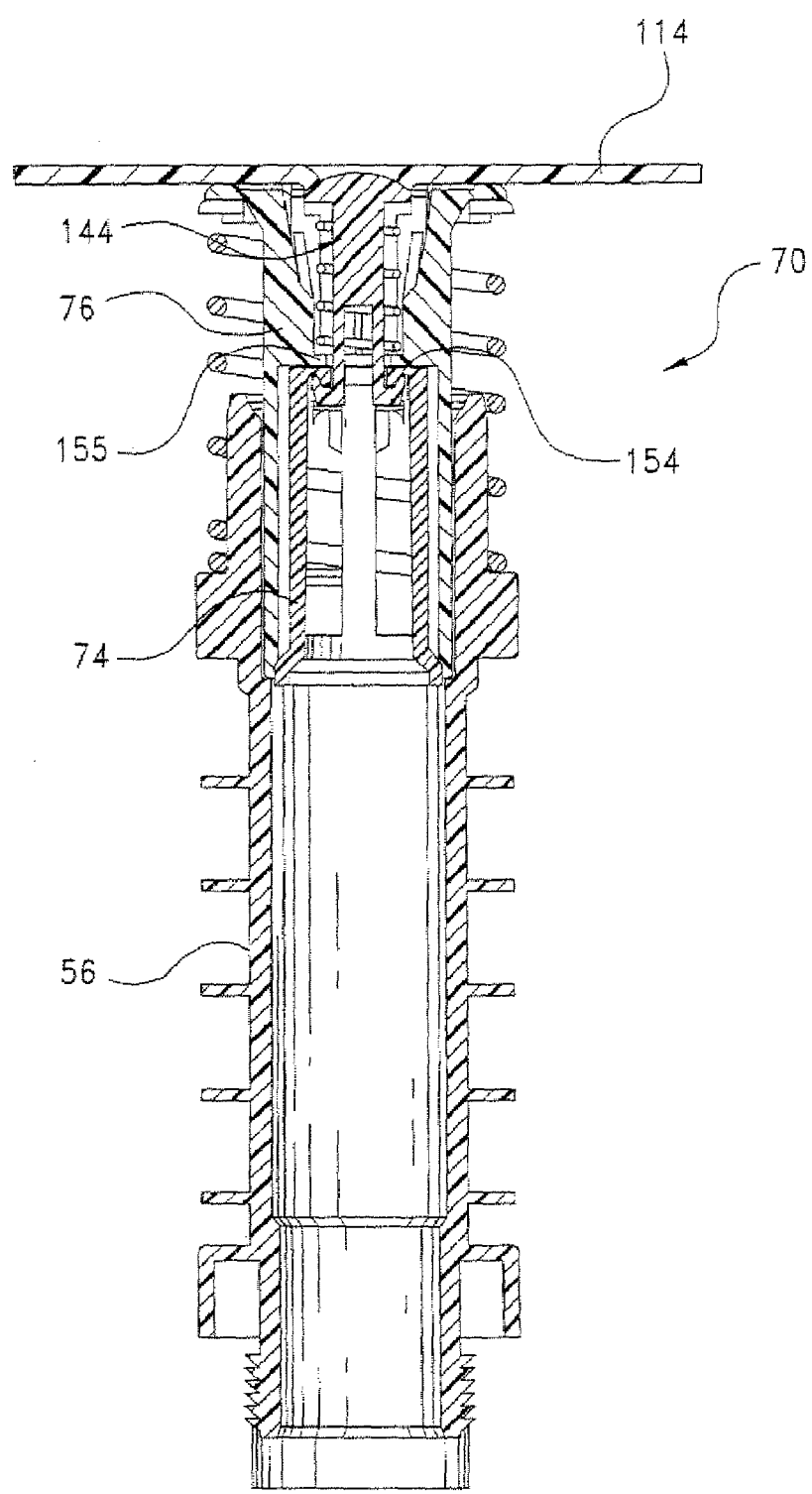
FIG. 10 is a cross-sectional side view of the extension and locking assembly shown constructed according to a further embodiment of the present invention.
Figure 11:
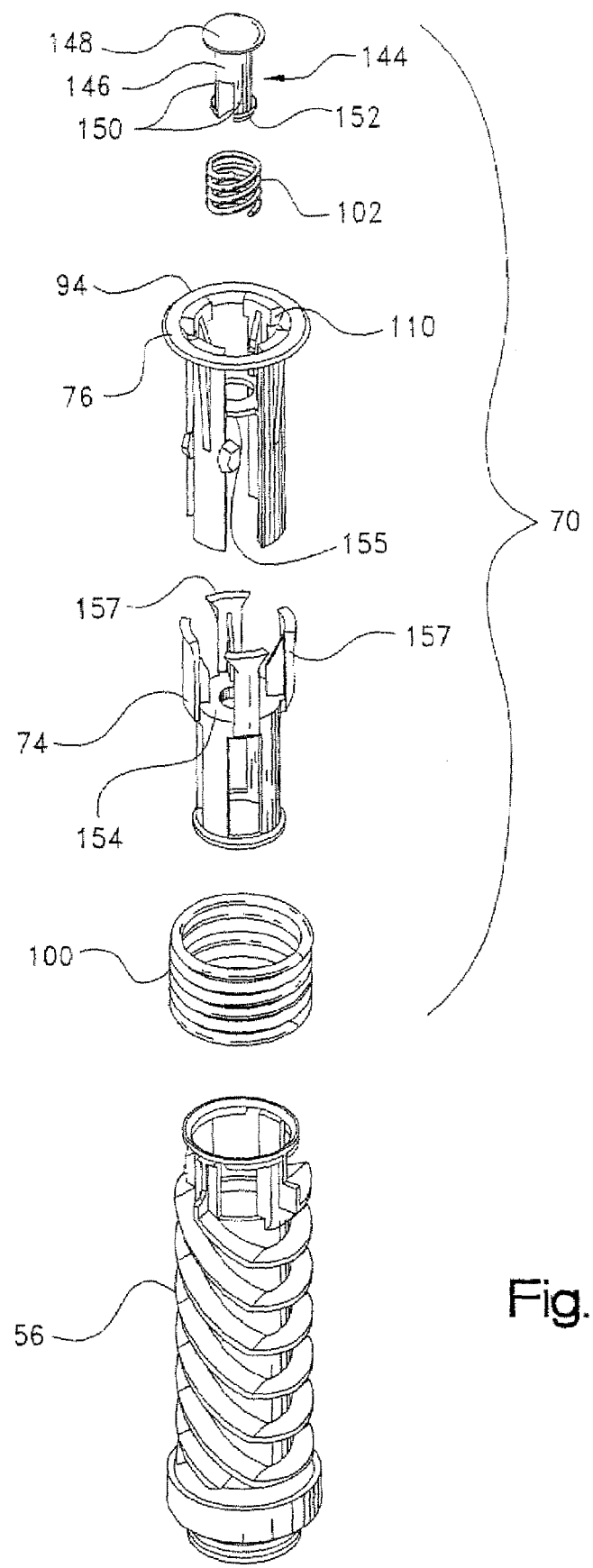
FIG. 11 is an exploded view of the extension and locking assembly of FIG. 10.

A second embodiment of the extension and locking assembly 70 is illustrated in FIGS. 10 and 11. In this embodiment, the bypass feature is provided by a separate valve component, indicated generally at 144. Valve component 144 operates in the same manner as the bypass valve described above, and includes a body 146; an enlarged valve head 148; and a pair of elongated and axially-extending fingers 150, each of which have a catch 152 at their distal ends. The body 146 of the valve component is received in a circular opening defined by an annular support 154 in the locking members with the catches 152 engaging the support 154 to prevent the valve component from being removed from locking member 74. Bypass spring 102 extends between the head 148 of the valve component and an inner annular shoulder 155 of the bypass member, and urges valve component 144 outwardly from the support core.

The enlarged annular head is absent from the locking member 74 illustrated in FIG. 11. Instead, the valve head 148 and the catches 152 on the fingers 150 of the valve component 144 retain the bypass member and valve component together. Main spring 100 is applied directly to the enlarged head 94 of the bypass member. The outer end of fingers 157 of locking member 74 are accessible through the openings 110 in the head 94 of the bypass member, and can be engaged by the protrusions 116 on end cap 114 to move the locking member inwardly into the support core. The locking member 74 and bypass member 76 otherwise have the same configuration as discussed previously and operate in the same manner to lock the extension and locking assembly in an outward position if an element is absent, or if an element does not have an appropriate arrangement of protrusion(s).

Figure 12:
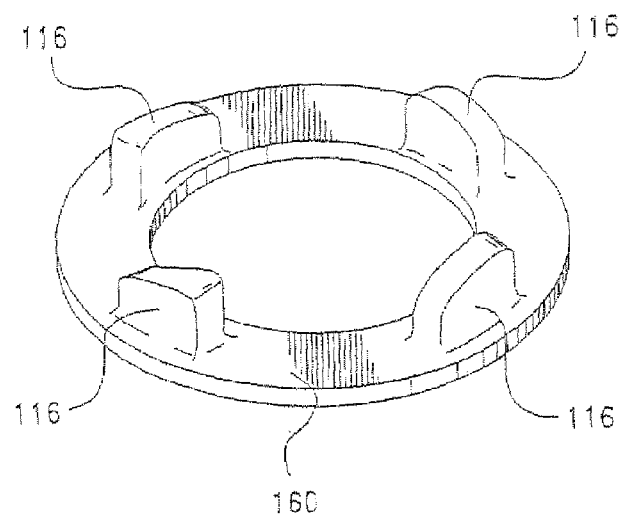
FIG. 12 is an elevated perspective view of a separate end piece with protrusions for the filter of FIG. 1.
Figure 13:
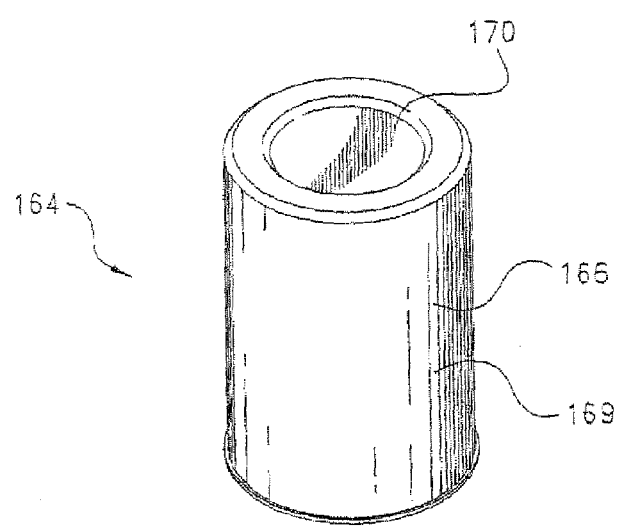
FIG. 13 is an exploded view of the container and a fresh element for the fuel filter of FIG. 1.
Figure 13:
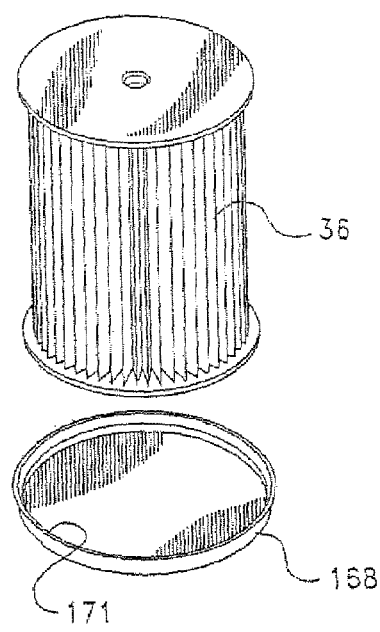
Figure 14:
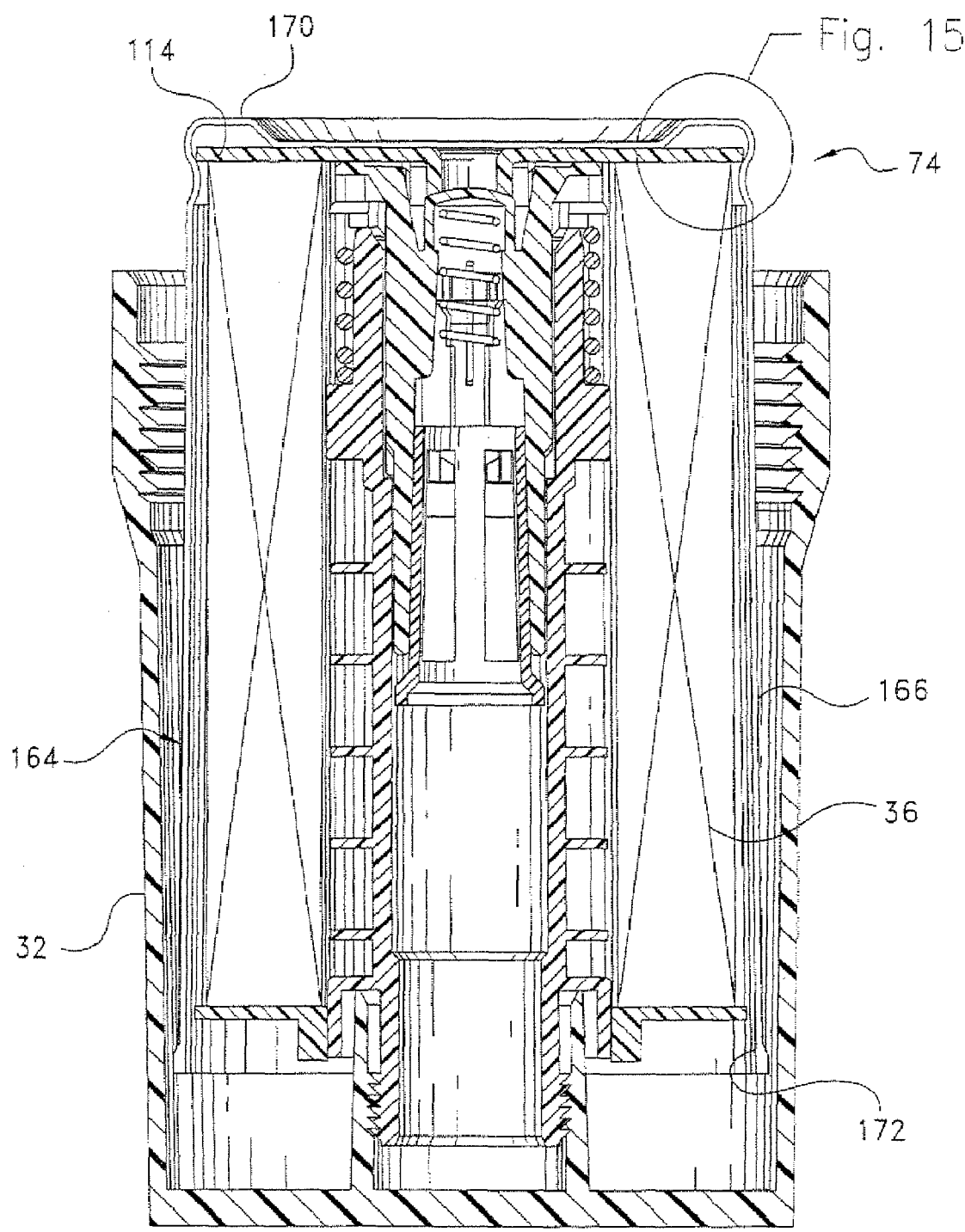
FIG. 14 is a cross-sectional side view of a first embodiment of the container for is the filter element.

A further embodiment of the filter element of the present invention is illustrated in FIG. 12. In this embodiment, the protrusions 116 are formed in a separate end piece 160. End piece 160 has an annular configuration, and fits against the inside surface of the end cap 114. The end piece 160 can be permanently fixed to the end cap, such as with adhesive, or can merely be located against the end cap and held in place by friction fit, or by the interaction with the locking member 76. The angled or helical distal end surfaces of the protrusions are clearly visible in this Figure. The remainder of the filter element is preferably the same as described previously.

Referring now to FIGS. 13–22, a further feature of the present invention is that a fluid-tight container is provided for the filter element that substantially reduces, if not eliminates, fouling the surrounding area with dripping fuel. The container is also handy for shipping, and eliminates the need for a shipping carton or box. Referring first to FIGS. 13–16, the container is indicated generally at 164, and includes an imperforate, cup-shaped body 166, and an imperforate lid or cap 168. The cup-shaped body has a sidewall 169 with a cylindrical dimension slightly larger than the element, and disk-shaped end wall 170. The body and lid form a fluid-tight enclosure with a dimension slightly larger than the element to entirely enclose the filter element. The body also has a dimension sufficient to enable it to be inserted into the housing body 32, between the housing body 32 and the filter element 36.

Figure 16:
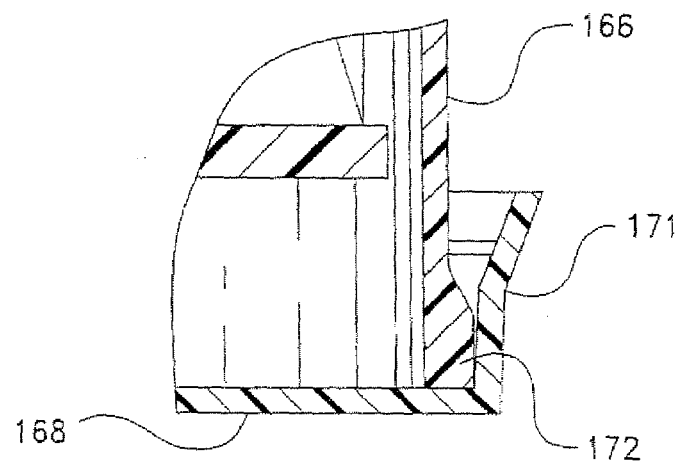
FIG. 16 is a cross-sectional enlarged view of another portion of the container of FIG. 14.

Lid 168 has an annular, axially extending lip portion 171, which as shown in FIG. 16, closely receives and cooperates with a bead 172 bounding the open end of the housing body to enable the lid to be easily attached to and removed form the body. Other techniques are of course possible for easily attaching the lid to the body, such as corresponding screw threads, and any technique is possible, as long as it allows relatively easy attachment and removal of the lid.

Figure 15:
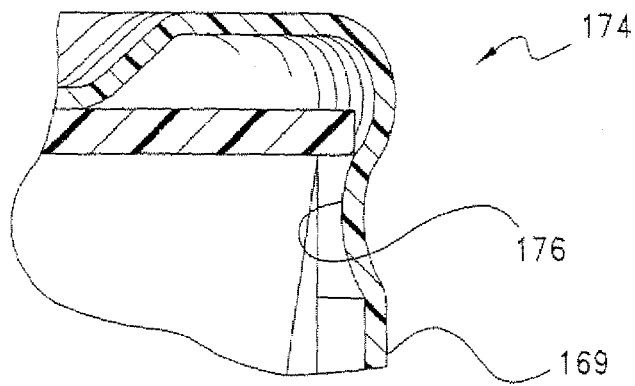
FIG. 15 is an enlarged view of a portion of the container of FIG. 14.

The container 164 further includes a retaining device, indicated generally at 174, integral with either the sidewall 119 or end wall 170. As shown in FIG. 15, the retaining device 174 can include a resilient member, such as an annular channel or ridge 175 formed in the sidewall 32, that engages around the outer periphery of end cap 114. The sidewall 169 has some resiliency to allow the container body 166 to be easily located over the filter element, and snap around the end cap 114 to hold the end cap against end wall 170.

Figure 17:
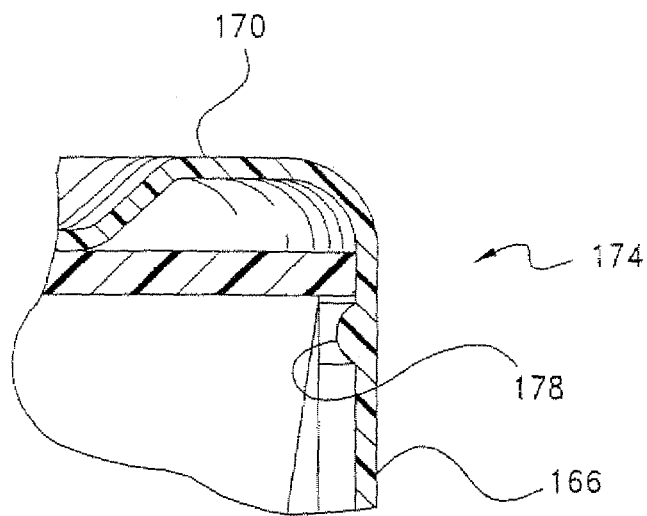
FIG. 17 is a cross-sectional enlarged side view of a portion of the container, illustrating a second embodiment of the container.

An alternative embodiment of the retaining device 174 is shown in FIG. 17. In this embodiment, an annular bead 178 is formed near the end wall 170, and engages the periphery of the end cap 114 when the container is located over the filter element. The annular bead 178 is likewise formed in sidewall 169, and the sidewall resiliently deflects to allow the container body 166 to be easily located over the filter element.

The body 166 and lid 16 are preferably formed from inexpensive, lightweight material, such as plastic, polypropylene, polyethylene, polycarbonate, PET, or other similar material. The material is preferably easily incinerated (burned), or at least recyclable. The body 166, including retaining device 174, and lid 168 are each preferably formed unitary (in one piece) by appropriate techniques, such as injection molding, vacuum-forming or drawing. While the dimensions of the body and lid can vary, it is preferred that the body and lid have relatively thin walls, and it has been found that a body and lid with a wall thickness of between 0.015 and 0.030 inches, provides a durable, inexpensive and incineratable product.

As should be appreciated, when the filter element is to be changed, the fresh element is removed from the container 164. The fresh element is preferably inverted in the container for shipping, and the end caps on the element can be dimensioned such that the retaining device does not retain the fresh element in the container, or the element is only loosely retained. In any case, the body of the empty container is then inverted and located open-end first, down around the filter element. This is facilitated by the element being supported somewhat outwardly from the housing, as discussed above. The container is pushed downwardly until the retaining device is received and snapped around the end cap. The body of the container can then be removed from the housing, thereby simultaneously removing the element. When the container body is free from the housing, the container body is quickly inverted to reduce the amount of fuel or oil dripping onto the surrounding area. This also virtually eliminates skin-contact with the element and the fuel or oil. Once inverted, the container body catches any remaining fuel or oil, and the lid 168 can be easily attached to the body 166 to form a fluid-tight enclosure for the element. Since it is preferred that the element is comprised of combustible materials, the spent element and container can then be disposed of in an incinerator.

Figure 18:
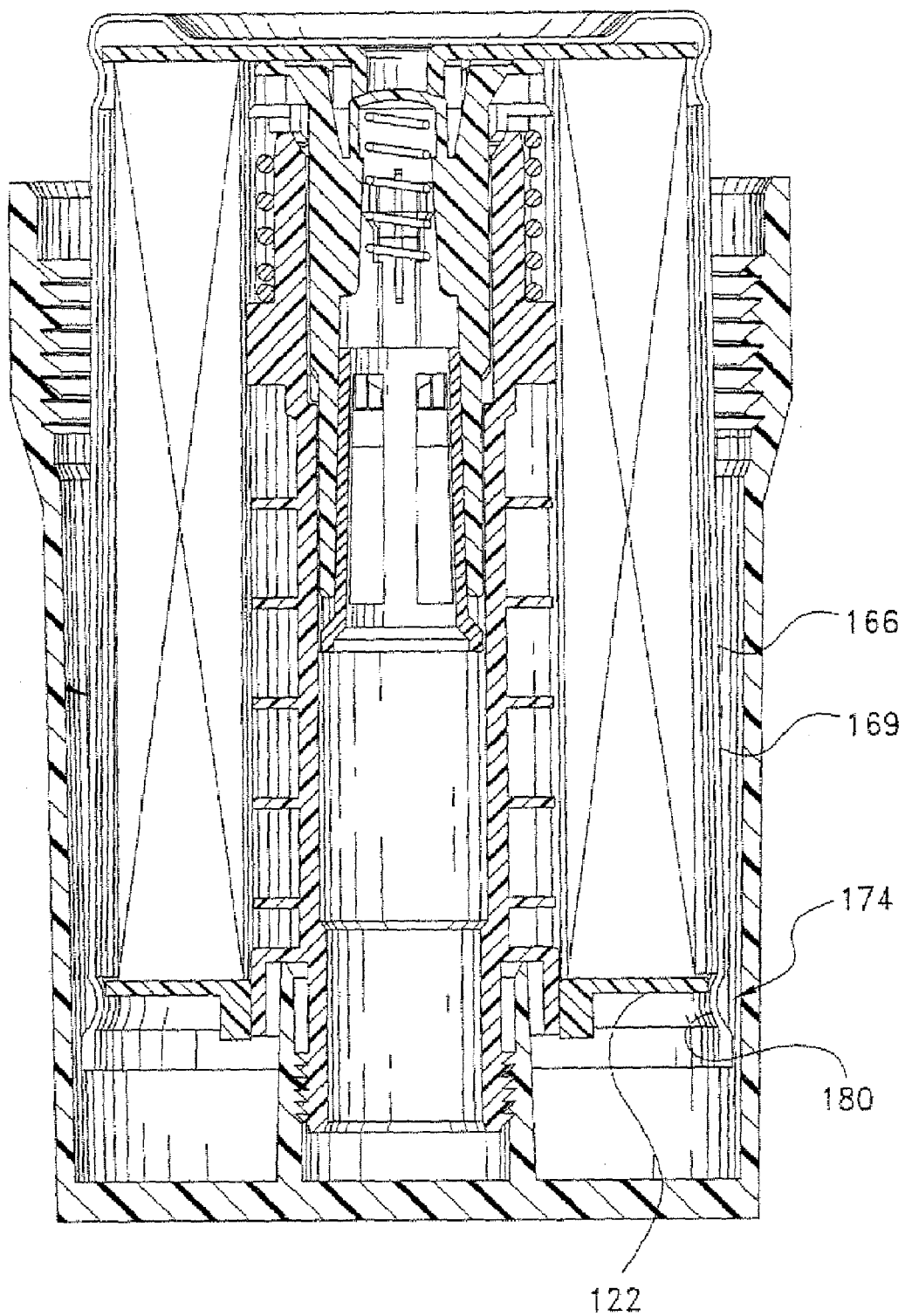
FIG. 18 is a cross-sectional side view of a third embodiment of the container.

While the retaining device is illustrated above as being unitary with the sidewall of the container, the retaining device can alternatively be unitary with the end wall 170, or formed as a separate piece and permanently fixed to the end wall or sidewall. There are numerous embodiments of the retaining device that would be appropriate for the present invention. For example, as shown in FIG. 18, the retaining device 174 can be formed at the opposite, open end of the container body 166, and comprises a channel, ridge or bead 180 in sidewall 169 that snaps around the opposite end cap 122 of the element.

Figure 19:
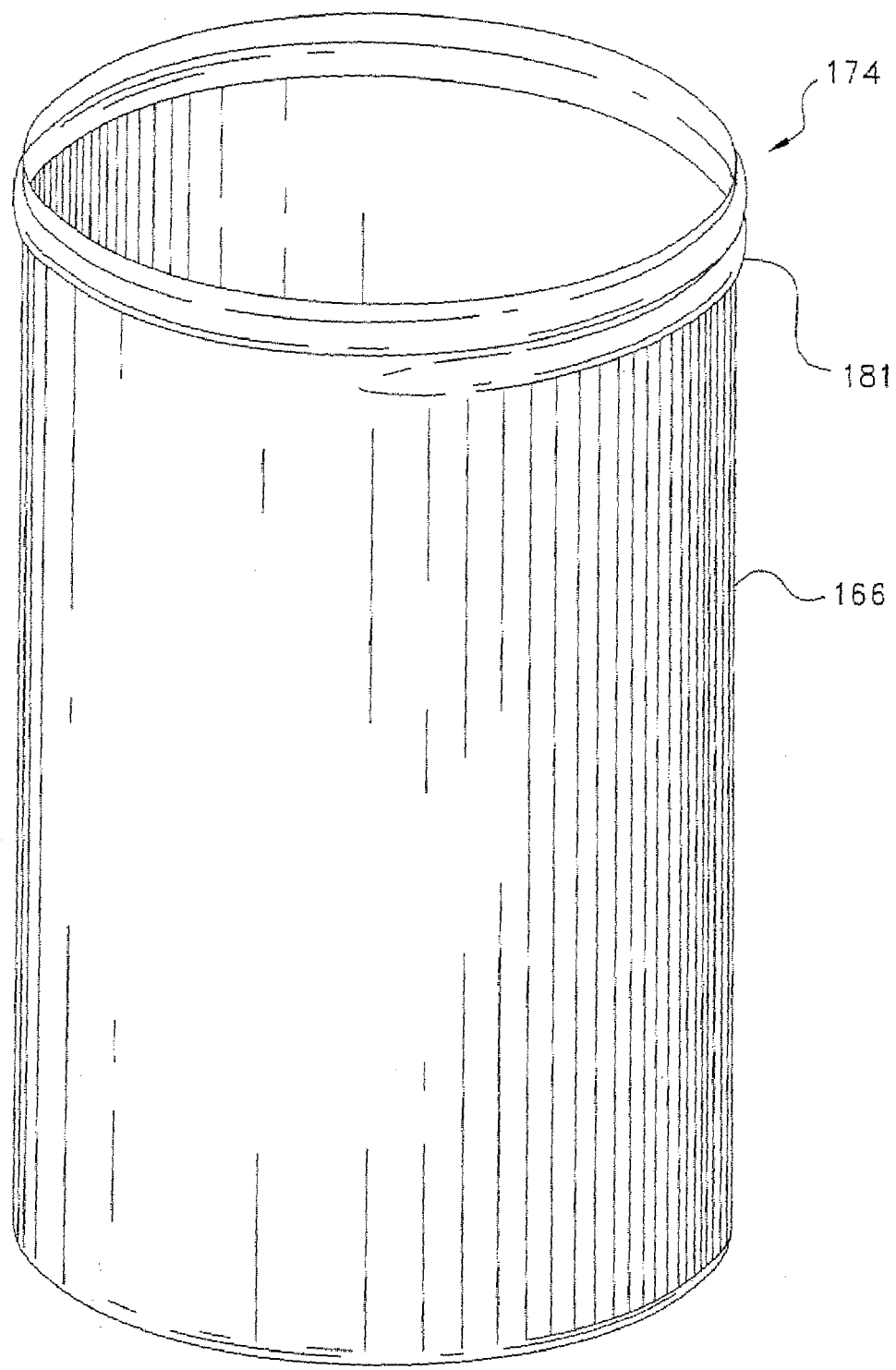
FIG. 19 is an elevated perspective view of a fourth embodiment of the container.

FIG. 19 shows a further embodiment, where the container body can include a retaining device 174 comprising a screw thread 181. The screw thread cooperates with end cap 122 to allow the container body to be screwed onto the end cap. The lid (not shown) can then have cooperating internal threads to allow the lid to be easily screwed onto (and off of) the container body.

Figure 20:
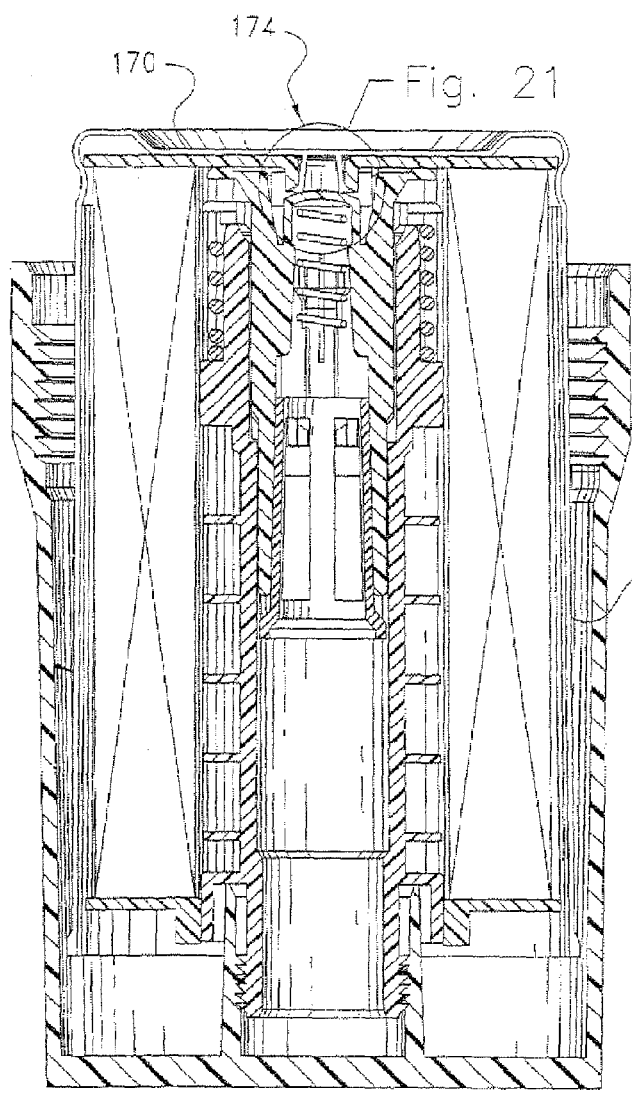
FIG. 20 is a cross-sectional side view of the container, illustrating a fifth embodiment of the container.
Figure 21:
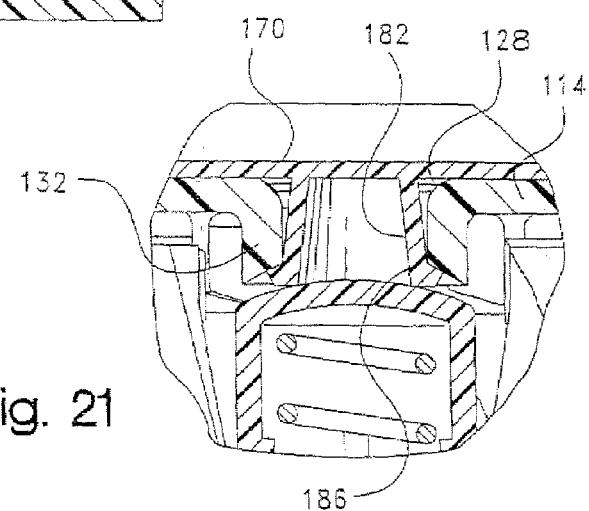
FIG. 21 is an enlarged view of a portion of the container of FIG. 20.

FIGS. 20 and 21 show a still further embodiment, where the retaining device 174 comprises an annular flange 182 centrally located on the end wall 170 of the container body 166, and received in the central opening 128 of the end cap 114 of the element. The flange 182 includes an annular, radially-outward directed catch 186 at the distal inner end that deformably engages the annular flange 132 surrounding opening 128 in end cap 114 to retain the element to the container.

Figure 22:
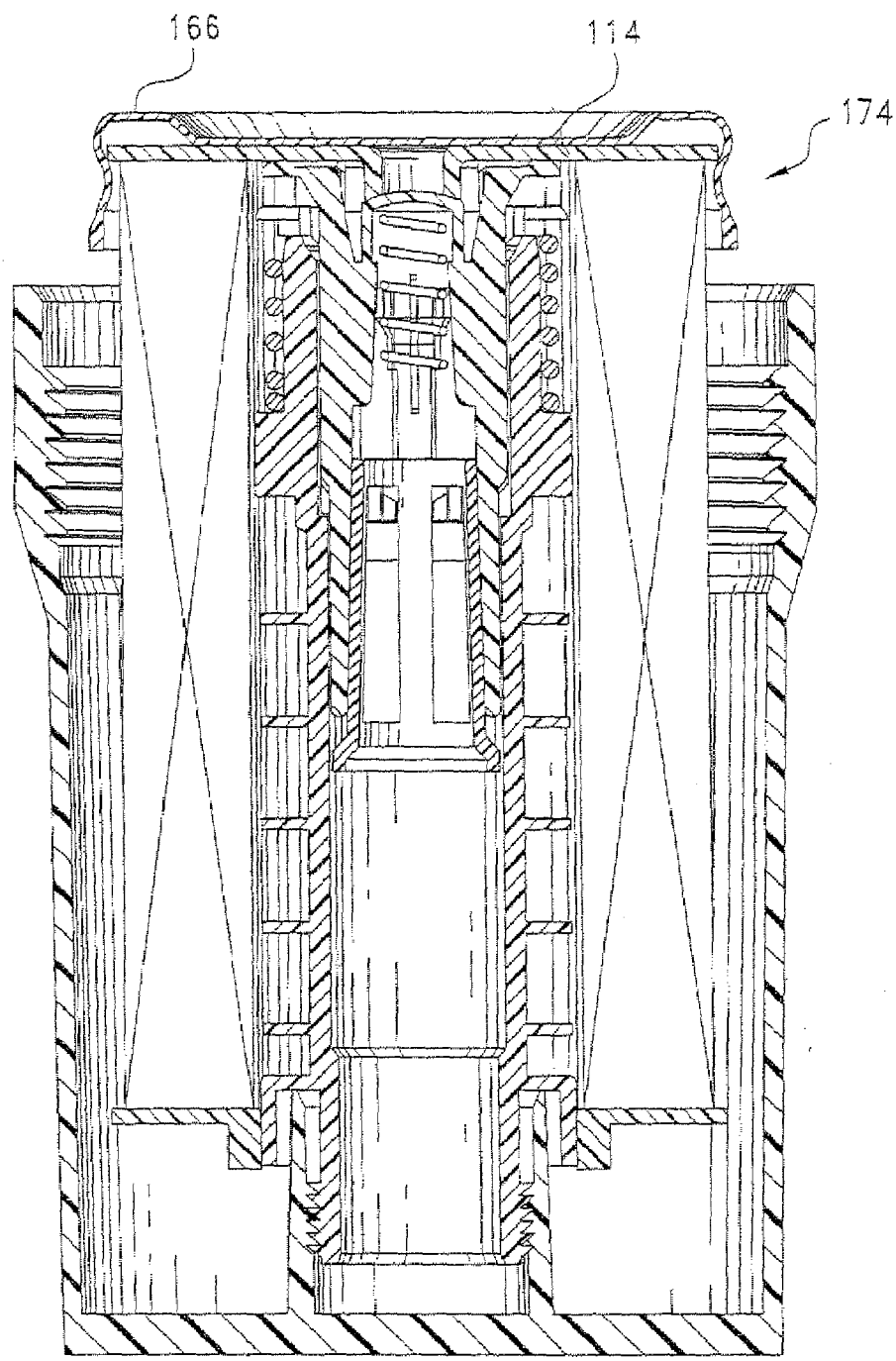
FIG. 22 is a cross-sectional side view of a sixth embodiment of the container.

The length of the container body 166 can of course vary, with the lid 168 consequently having a longer or shorter axial length such that the two components entirely encapsulate the element. As shown in FIG. 22, the container body 166 is shown as a relatively short component, only as long as necessary that the retainer device 174 snaps around the end cap 114 of the element. The lid 168 would then have a relatively long length to fully encapsulate the element. Other alternatives are of course possible.

Thus, as described above, the filter of the present invention prevents an improper filter element from being used in the filter and prevents operation of the filter without a filter element in place. Mess and environmental issues are substantially reduced, if not eliminated, during an element change. The filter element is also simple and low-cost to manufacture.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter element including a ring of filtration media circumscribing a central axis and having first and second ends; an end cap assembly at the first end of the filter media including i) a first flat annular end cap sealingly bonded to the first end of the filtration media, and a separate annular end piece located in sealing relation with the first end cap; and a second flat annular end cap sealingly bonded to the second end of the filtration media; the second end cap including a central opening along the central axis of the filter element; said end cap assembly at the first end of the filter element including a central opening along the central axis of the filter element, said central opening of said end cap assembly having a smaller diameter than said central opening of said second end cap, and being defined by an annular flange integral with an inner surface of said end cap assembly and extending axially inward from said end cap assembly toward said second end cap and terminating at a point closer to said end cap assembly than said second end cap, said annular flange spaced radially inward from the ring of filtration media; and a series of axially-extending protrusions affixed to said annular end piece of the end cap assembly radially between said flange and said ring of filtration media, said protrusions extending axially inward from said end cap assembly toward said second end cap and terminating at a point closer to said end cap assembly than said second end cap.

2. The filter element as in claim 1, wherein said protrusions are unitary with said end piece.

3. The filter element as in claim 1, wherein said protrusions are evenly spaced in an annular arrangement surrounding said annular flange.

4. The filter element as in claim 1, wherein each of said protrusions has a distal free end, and the distal free end of the protrusions has a helical ramped surface.

5. The filter element as in claim 1, wherein the ring of filtration media radially outwardly bounds the protrusions.

6. The filter element as in claim 1, wherein said protrusions are radially spaced inward apart from the filtration media, and radially spaced outward apart from the flange.

7. The filter element as in claim 1, wherein the protrusions extend in arcuate segments in an annular configuration along an inner surface of the end piece.

8. The filter element as in claim 1, wherein the separate annular end piece has an inner flat surface, and the protrusions are fixed to and project from the inner flat surface.

9. The filter element as in claim 1, wherein said annular end piece is located in surface-to-surface relation with a surface of the first annular end cap.

10. The filter element as in claim 9 wherein the annular end piece is located against an inner surface of the first end cap.

11. The filter element as in claim 1, wherein said protrusions are spaced radially outward apart from said annular flange.

12. A filter element including a ring of filtration media circumscribing a central axis and having first and second ends; an end cap assembly at the first end of the filter media including i) a first flat annular end cap sealingly bonded to the first end of the filtration media, and a separate annular end piece located in sealing relation with the first end cap; and ii) a second flat annular end cap sealingly bonded to the second end of the filtration media; the second end cap including a central opening along the central axis of the filter element; said end cap assembly at the first end of the filter element including a central opening along the central axis of the filter element, said central opening of said end cap assembly having a smaller diameter than said central opening of said second end cap, and being defined by an annular flange integral with an inner surface of said end cap assembly and extending axially inward from said end cap assembly toward said second end cap and terminating at a point closer to said end cap assembly than said second end cap, said annular flange spaced radially inward from the ring of filtration media; and at least one axially-extending protrusion affixed to said annular end piece of the end cap assembly radially between said flange and said ring of filtration media, said at least one protrusion extending axially inward from said end cap assembly from said end cap assembly toward said second end cap and terminating at a point closer to said end cap assembly than said second end cap.

* * * * *